Dec. 20, 1966 J. A. MEYER 3,292,934

STABILIZER ARM FOR PHONOGRAPHS

Filed May 13, 1963

INVENTOR:
JERRY A. MEYER,

BY Thomas A. Briody
HIS ATTORNEY.

United States Patent Office 3,292,934
Patented Dec. 20, 1966

3,292,934

STABILIZER ARM FOR PHONOGRAPHS

Jerry A. Meyer, Decatur, Ill., assignor to General Electric Company, a corporation of New York Filed May 13, 1963, Ser. No. 280,027
3 Claims. (Cl. 274—10)

This invention relates to an improvement in phonographs, and in particular to phonographs wherein a record player includes a positioning means to help align records into axial relationship with the spindle of a turntable.

In using a record player from time to time, there is often a degree of difficulty involved in accurately positioning records over the spindle of the turntable. For example, when the room wherein the phonograph is located is relatively dark, it is often far from easy for the average person to readily locate the central hole of the record and accurately position the spindle of the turntable therethrough. As another example, when relatively large records, such as twelve inch records are being used, the record itself often obscures the view of the spindle when the record is held at the normal altitude and position for placing it on the spindle. An important object of my invention is to provide a record player having an improved record positioner for effectively aligning a record aperture with the turntable spindle.

Another object of my invention is to provide for a phonograph an improved record positioning device which readily aligns a record aperture with a turntable spindle and is also adapted to resiliently cushion the record.

A further object of my invention is to provide an improved record positioning device which is simplified in construction, efficient in operation, and enhances the life of records operated in conjunction with the device.

A still further object of my invention is to provide an improved record positioning device which involves a minimum number of parts and readily lends itself to a wide variety of phonograph applications.

In carrying out my invention, in one form thereof, I provide a record player having a record turntable and a record-centering spindle extending upwardly therefrom. The record player also employs an arm which is disposable above the turntable where it may be arranged to engage the top of a stack of records on the spindle, for stabilizing and balancing the records. The record stabilizing arm includes a record positioner which comprises an exterior cylindrical wall formed integrally on the arm, and a resilient cushion for the wall. The wall faces generally toward and is spaced substantially from the record-centering spindle when the stabilizing arm is in its rest position. The resilient cushioning material is arranged uniformly on the exterior wall of the arm. When the stabilizing arm is in its rest position, the periphery of a record engages the resilient material. The record is thereupon cushioned and positioned into substantially aligned relationship with the spindle. By using the resilient material on the cylindrical wall of the stabilizing arm, the periphery of the record is effectively protected from any possible damage, and undesirable slippage of the periphery of the record from the positioning wall is effectively prevented. In addition, the resilient material helps to allow for tolerance variations between the record positioner, the periphery of the record, and the spindle. The record positioner of the present invention is, therefore, simplified in construction, readily manufacturable, and yet operates in efficient fashion to position the records while obviating any possible damage thereto.

Further aspects of my invention will become apparent hereinafter, and the specification concludes with claims particularly pointing out and distinctly claiming the subject matter which I regard as my invention. The invention, however, as to organization and method of operation, together with further objects and advantages thereof, may best be understood by reference to the following description when taken in conjunction with the accompanying drawing, in which:

Figures 1, 2, 3:
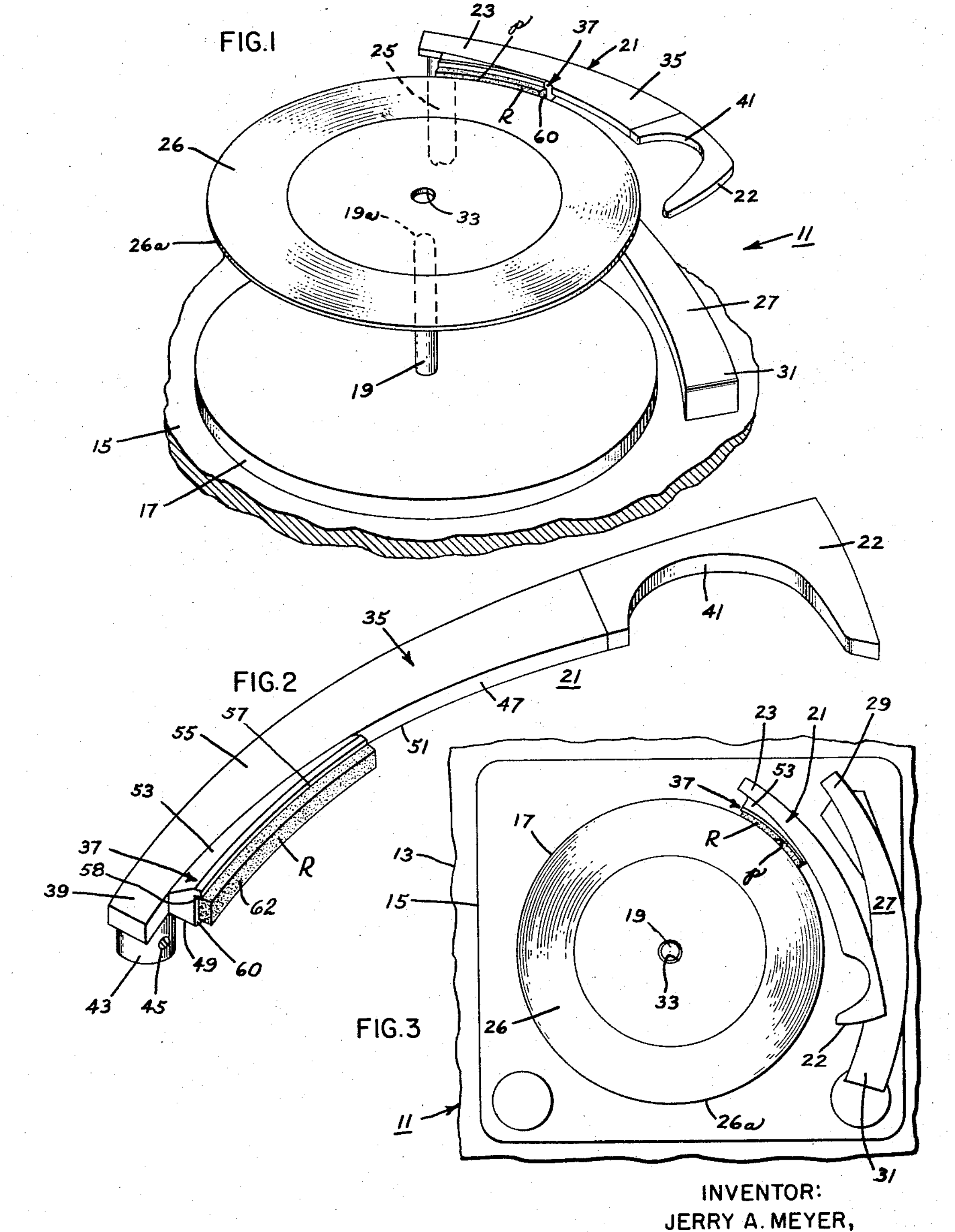
FIG. 1 is a fragmentary perspective view of a phonograph record player employing a preferred embodiment of my invention.
FIG. 2 is an enlarged perspective view of the record stabilizing arm of FIG. 1.
FIG. 3 is a top view of the record player, showing the tone arm and stabilizing arm at rest positions.

Referring first to FIGS. 1 and 3, as shown therein I have provided a record player 11 comprising a base 13, a record player frame 15 mounted on base 13, and a turntable 17 carried upon the frame 15. For centering records and positioning them in the desired relationship with turntable 17, a spindle 19 is extended upwardly from turntable 17 in the usual manner.

The record player 11 shown is an automatic record changer type, and employs a record balancing arm 21. The arm 21 is arranged in general parallel to the turntable 17, and it is carried by attachment of its rear end 23 to a vertical post member 25. Post member 25 is rotatably journalled and may be raised and lowered, in the usual fashion. The balancing arm 21 is thus arranged on the record player 11 so that it may be raised and lowered, and is swingable sideways from its raised position for loading records such as the record 26 upon the spindle 19. More particularly, for loading records on the spindle 19, the blancing arm 21 may be raised and swung angularly from a position wherein its free end 22 generally overlies the spindle 19 to a position wherein its free end is adjacent to but spaced outwardly from the periphery of a record which is to be loaded. The balancing arm 21 may then be located in a detended position, such as where it is shown in FIGS. 1 and 3, to allow clearance for a record to be loaded upon spindle 19.

A tone arm 27 is located alongside of and above turntable 17, and is provided with a pivotal support near its rear end 29, in the well known manner. The arm 27 is pivotally supported so that vertical and horizontal movement is permitted and a pickup stylus or needle located at the front end 31 of the arm can engage and reproduce sound signals from the groove of a phonograph record 26 placed on the turntable 17.

With the record player arrangement thus far described, it has been found that there is a degree of difficulty sometimes involved in locating the center aperture 33 of a record 26 upon the spindle 19. More particularly in such circumstances as where the record player is located in a relatively dark room, or where the manual dexterity of the operator of the record player is minimal, difficulty may be encountered in readily centering the cylindrical aperture 33 of a record 26 upon the spindle 19. My invention substantially alleviates such difficulty in an improved way, as shall now be described.

The record balancing arm 21 has an elongated and flat arcuate body 35, with a record positioning segment 37 integrally formed thereon near the supported end 39 of body 35. More particularly, near its free end 22, the arcuate body 35 of arm 21 has a curved recess 41 formed thereon. Recess 41 of arm 21 allows clearance for a 45 r.p.m. spindle that may be place on the spindle 19, and enables the adjacent bottom surfaces of the free end 22 of arm 21 to engage a record (which is to be automatically played) in partially surrounding adjacency to the aperture 33 of the record. On the underside of the supported end 39 of balancing arm 21 there is formed an integral upright sleeve 43 which includes an aperture (not shown) therein for receiving the upper end of post member 25 (viewing FIG. 1). The sleeve 43 may be secured to post member 25 by means of one or more set screws 45 which are threaded into engagement with sleeve 43 and impinge upon the member 25.

As shown best in FIG. 2, the record positioning segment 37 is integrally formed on the inner curved wall 47 of body 35, and it includes a lower elongated bottom 49 disposed in generally coplanar relationship with the bottom 51 of body 35. Segment 37 also includes a top 53 which is generally inclined upwardly from the plane of the top surface 55 of body 35 and is curved inwardly toward spindle 19 (i.e., when the arm 21 is in the position shown in FIG. 3). The outermost portion of top 53 of the record positioning segment 37 is turned into parallel relationship to the top surface 55 of body 35 of the arm (as shown in FIG. 2), and is then coterminous with an upper cylindrical wall 57. The upper cylindrical wall 57 extends downwardly for a relatively short depth, and is then stepped inwardly at 58 for connection to an elongated and relatively deep cylindrical wall 60. It will thus be seen that the upper wall 57 and the outermost portion of top 53 of the segment 37 form a ledge or shelf that overhangs the cylindrical wall 60 (FIG. 2).

In accordance with my invention, the elongated cylindrical wall 60 of the record positioning segment 37 has a strip of resilient cushioning material R attached thereto. The cushioning material R is preferably a spongy substance such as polyurethane, and it may be glued to the elongated wall 60 so that its upper elongated surface is located just underneath the ledge formed by wall 57. As further shown in FIG. 2, the spongy material R extends along and substantially covers the length of wall 60. The purpose and importance of the cushioning material R shall become apparent hereinafter.

The cylindrical wall 60 of record positioning segment 37 has a radius of curvature substantially the same as the radius of curvature of the periphery 26*a* of a record 26 which is to be positioned for precise engagement with the spindle. For example, the radius of curvature of wall 60 for positioning a twelve inch diameter record would be approximately six inches. In addition, the axis of curvature of the cylindrical wall 60 is substantially coincident with the axis of the spindle 19 when the record balancing arm 21 is in the loading position shown in FIGS. 1 and 3. The cushioning material R is in the form of a box shaped strip approximately .125 inch thick and provides an outer cylindrical surface 62 which also is substantially coincident with the axis of the spindle 19 when arm 21 is in the loading position.

With such an arrangement, when a record such as record 26 is to be loaded upon spindle 19, a cylindrical portion *p* of its periphery 26*a* is first engaged with the spongy material R. Because the material R is spongy, it resiliently displaces to allow the record portion *p* to move into juxtaposition with the outer surface of cylindrical wall 60, as shown in FIG. 1. The record 26 thereby may be conveniently positioned, as shown in FIG. 1, with its aperture 33 substantially aligned with and slightly above the cylindrically configured outer end 19*a* of the spindle 19. After the periphery 26*a* of the record has been engaged into juxtaposition with arcuate wall 60 of the record positioning segment 37, the aperture 33 of the record 26, which is slightly larger in diameter than the outer diameter of spindle 19, is readily slipped into cooperation with the cylindrically configured outer end of the spindle. The record 26 is thereupon readily positioned on the spindle for play purposes.

Because the resilient material R is utilized on the cylindrical wall 60 of the record positioning segment, the periphery of the record 26 is effectively protected from any undesirable wear or damage. In addition, the material R provides a cushioning effect which helps to compensate for tolerance variations between the record positioning segment 37, the record 26 and the spindle 19. It will be also understood that when the periphery of the record 26 engages the spongy material R, undesirable slippage of the periphery of the record from the positioning segment is effectively prevented.

It will now, therefore, be understood that in accordance with the present invention I have provided an improved record positioning device which is simplified in construction and efficient in operation. It will be further realized that my improved record positioner effectively cushions and positions a record in such a manner that it helps to enhance the life of the record, involves a minimum expense, and lends itself readily to a wide variety of phonograph applications.

While in accordance with the patent statutes, I have described what at present is considered to be the preferred embodiment of my invention, it will be obvious to those skilled in the art that various changes and modifications may be made therein without departing from my invention, and I, therefore, aim in the following claims to cover all such equivalent variations as fall within the true spirit and scope of this invention.

What I claim as new and desire to secure by Letters Patent of the United States is:

1. In a phonograph record playing apparatus including a turntable for receiving records, a spindle disposed on the turntable for positioning records upon said turntable, and a stabilizing arm arranged in proximity to said turntable to balance records into generally perpendicular relationship with said spindle, means on said stabilizing arm for positioning at least one record into substantially aligned axial relationship with said spindle thereby to assure that said record will cooperate with said spindle in a precise manner, and resilient means on said positioning means for cushioning the periphery of a record positionable thereby, said resilient means serving to protect the periphery of said record, to allow for tolerance variations between said positioning means, said record and said spindle, and to prevent undesirable slippage of the periphery of said record relative to said positioning means.

2. In a phonograph record playing apparatus including a turntable for receiving records, a spindle disposed on the turntable for positioning records upon said turntable, and a stabilizing arm arranged in proximity to said turntable to balance records into generally perpendicular relationship with said spindle, said stabilizing arm having a record balancing position and a rest position, a cylindrical wall on said stabilizing arm for positioning at least one record into substantially aligned axial relationship with said spindle when said arm is in the rest position thereby to assure that said record will cooperate with said spindle in a precise manner, and resilient means covering the inside surface of said cylindrical wall for cushioning the periphery of a record positionable thereby, said resilient means serving to protect the periphery of said record, to allow for tolerance variations between said positioning wall, said record and said spindle, and to prevent undesirable slippage of the periphery of said record relative to said positioning wall.

3. The phonograph apparatus of claim 2 wherein the resilient material is polyurethene.

References Cited by the Examiner

UNITED STATES PATENTS

| | | | |
|---|---|---|---|
| 1,349,611 | 8/1920 | Host | 274—1 |
| 1,455,355 | 5/1923 | Reinhold | 274—1 |
| 2,062,396 | 12/1936 | Carson | 274—10 |
| 2,485,575 | 10/1949 | Deaver | 274—14 X |
| 2,525,926 | 10/1950 | Matthews | 274—23 X |
| 3,081,094 | 3/1963 | Knopfle | 274—10 |
| 3,194,567 | 7/1965 | Conrad | 274—10 |
| 3,219,350 | 11/1965 | Geiger | 274—23 X |

FOREIGN PATENTS

| | | |
|---|---|---|
| 80,035 | 10/1955 | Denmark. |

NORTON ANSHER, *Primary Examiner.*

WILLIAM E. JACKSON, J. F. PETERS, *Assistant Examiners.*